United States Patent Office 3,268,548
Patented August 23, 1966

3,268,548
WATER-SOLUBLE PHTHALOCYANINE
DYESTUFFS
Johannes Heyna, Hartmut Springer, and Erich Schinzel, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Feb. 28, 1961, Ser. No. 92,172
Claims priority, application Germany, Mar. 5, 1960, F 30,688
8 Claims. (Cl. 260—314.5)

The present invention provides valuable phthalocyanine dyestuffs readily soluble in water which correspond to the following formula:

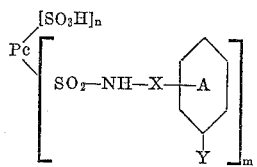

in which Pc represents a metal-containing phthalocyanine nucleus, X means a direct linkage or a bivalent organic radical, Y represents the group

—SO$_2$—CH$_2$—CH$_2$—OSO$_3$H or the group —SO$_2$—CH=CH$_2$, the radicals X and Y standing in meta- or para-position one to the other, $n$ represents a whole number of 1 to 3 and $m$ likewise a whole number of 1 to 3, the sum of $n$ and $m$ being at most 4, and wherein the benzene nucleus A may contain further substituents.

As examples for a bivalent organic radical defined by X the following groupings may be named, for instance,

—CH$_2$—CH$_2$—
—CH$_2$—CH$_2$—NH—

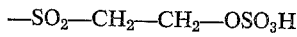

or

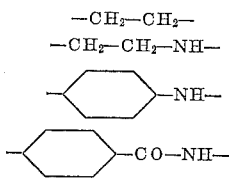

The novel dyestuffs, which possess valuable tinctorial properties, can be prepared by condensing an amine of the general formula

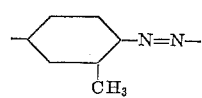

in which X, Y and A have the meanings indicated above, with a phthalocyanine sulfonic acid chloride and, if desired, treating the product so obtained with an alkali.

The dyestuffs of the invention can also be prepared by condensing an amine of the general formula

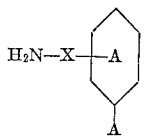

in which X and A have the meanings indicated above, with a phthalocyanine sulfonic acid chloride, converting the condensation product so obtained into the acid sulfuric acid ester and, if desired, treating the latter with an alkali.

The novel dyestuffs can be used for printing and dyeing processes. Their special value resides in the fact that fibers of native or regenerated cellulose can be dyed from salt-containing dye baths, either in the cold or in the hot, with the aid of alkalies, and blue to green dyeings are obtained which are distinguished by good wet fastness properties, a good fastness to rubbing, a good to very good fastness to light and a high brilliancy.

The following examples serve to illustrate the invention, but they are not intended to limit it thereto, the parts being by weight unless otherwise stated and the relationship of parts by weight to parts by volume being the same as that of the kilogram to the liter.

Example 1

60.3 parts of β-hydroxyethyl (3-amino)-phenylsulfone are converted into the acid sulfuric acid ester by heating with 48.6 parts of sulfuric acid of 60% strength. The reaction product is poured on to ice and the solution so obtained is neutralized by cautiously adding sodium hydroxide and sodium bicarbonate. Water is then added in an amount that the total volume is 1500 parts by volume. 97 parts of copper-phthalocyanine-(3)-tetrasulfochloride (obtainable as described in U.S. Patent 2,219,330) and 50 parts of sodium bicarbonate are then introduced, 10 parts of pyridine are added and the mixture is stirred at room temperature until the whole has been dissolved. The solution is then heated for a further 30 minutes at 50° C. The dyestuff is isolated by salting out with potassium chloride. After drying at 60° C. 250 parts of a blue product are obtained which dissolves in water with a turquoise blue coloration. By the action of agents having an alkaline reaction the dyestuff can be fixed on cotton and yields turquoise blue dyeings and prints having a good fastness to washing and to light. It has the following formula:

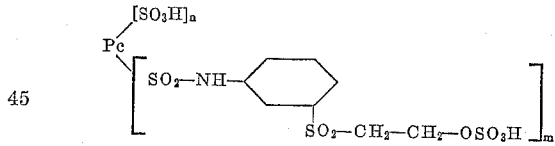

wherein Pc represents a copper-phthalocyanine nucleus, $n$ represents a whole number of 1 to 3 and $m$ likewise a whole number of 1 to 3, the sum of $n$ and $m$ being 4.

Dyestuffs having similar properties can be obtained by using in the above example instead of β-hydroxyethyl-(3-amino)-phenylsulfone the corresponding amounts of the following amines containing β-hydroxyethyl-sulfone groups:

β-hydroxyethyl-(3-amino-4-methoxy)-phenylsulfone,
β-hydroxyethyl-(3-amino-4-methyl)-phenylsulfone,
β-hydroxyethyl-(3-bromo-4-amino)-phenylsulfone,
β-hydroxyethyl-(3-amino-4-carboxy)-phenylsulfone or
β-hydroxyethyl-(3-amino-4-sulfo)-phenylsulfone

Example 2

84.3 parts of the acid sulfuric acid ester of β-hydroxyethyl-(4-amino)-phenylsulfone are dissolved in 700 parts of water by introducing dropwise 28.4 parts of sodium hydroxide solution of 33% strength and then adding solid sodium bicarbonate until the solution is neutral, the temperature being kept below +10° C. 87.2 parts of copperphthalocyanine-(3)-trisulfochloride (obtainable as described in U.S. Patent 2,219,330) are introduced into this solution, 10 parts of pyridine are added and the mixture is stirred at room temperature. By dropping in 2 N so-

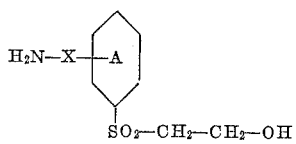

dium hydroxide solution a pH-value of 6.5 is maintained. As soon as the whole has been dissolved and sodium hydroxide solution is no longer consumed, the mixture is heated for 1 hour at 40–50° C. and the dyestuff is salted out with potassium chloride. After drying, 190 parts of a turquoise blue dyestuff are obtained which can be fixed on cotton fibers with the aid of agents having an alkaline reaction and yields dyeings having a very good fastness to washing and to light.

*Example 3*

A solution of 84.5 parts of the acid sulfuric acid ester of β-hydroxyethyl-(4-amino)-phenylsulfone is prepared as described in Example 2, and into this solution 97 parts of copper-phthalocyanine-(4)-tetrasulfochloride (cf. U.S. Patent 2,219,330, Example 9) are introduced. 10 parts of pyridine are then added and the mixture is stirred at 20–30° C. until the whole has been dissolved. By dropping in 2 N sodium hydroxide solution a pH-value of 6–6.5 is maintained. The mixture is then heated for 1 hour at 40–50° C. and worked up as described in Example 2. The dyestuff so obtained is very readily soluble in water and yields on cotton fibers with the aid of agents having an alkaline reaction turquoise blue dyeings and prints which possess good properties of fastness.

*Example 4*

97 parts of copper-phthalocyanine-(3)-tetrasulfochloride are suspended in 1000 parts of ice-water. A solution of 100 parts of sodium bicarbonate and 56.5 parts of the hydrochloride of β-hydroxyethyl - [4-(β-aminoethyl)-phenyl]-sulfone of the formula

in 1500 parts of water is added and the mixture is stirred for 12 hours at room temperature, for 1 hour at 40° C. and for 1 hour at 60–70° C. 250 parts of potassium chloride are then added and the condensation product is isolated by suction-filtration. After drying the product so obtained is introduced at a temperature below 40° C. into 1000 parts of concentrated sulfuric acid and the mixture is stirred for 12 hours at room temperature. The solution obtained is then poured on a mixture of 2000 parts of a saturated potassium chloride solution and 2000 parts of ice, and after having been stirred for a short while, the reaction product is filtered off with suction. The residue is repeatedly washed with a potassium chloride solution of 15% strength, then stirred with 2000 parts of water and 200 parts of anhydrous sodium acetate are added. The product is filtered off with suction, repeatedly washed with a potassium chloride solution of 15% strength and dried at 50–60° C.

135 parts of a blue powder are obtained which dissolves in water to give a turquoise blue colored solution. On cotton fibers the dyestuff yields, when developed with an alkaline agent, turquoise blue dyeings and prints having good properties of fastness.

The hydrochloride of β-hydroxyethyl-[4-(β-aminoethyl)-phenyl]-sulfone of the formula indicated above, which is used for the manufacture of the aforesaid dyestuff, can be prepared, for example in the following manner:

N-acetyl-β-phenylethylamine is converted into 4-[(β-acetylamino)-ethyl]-benzene-sulfochloride by treating it with chlorosulfonic acid. By reduction of the sulfochloride with sodium sulfite the corresponding sulfinic acid is obtained which is reacted with β-chloroethanol or ethylene oxide to form the β-hydroxyethyl-[4-(β-acetamino-ethyl)-phenyl]-sulfone having a melting point of 102–103° C. By saponification with hydrochloric acid the hydrochloride of the β-hydroxyethyl-[4-(β-aminoethyl)-phenyl]-sulfone is obtained in the form of white needles having a melting point of 100° C. The product contains 1 mol of crystal water.

*Example 5*

29 parts of β-hydroxyethyl-[3-nitro-4-(β-aminoethylamino)-phenyl]-sulfone of the formula

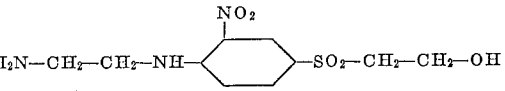

are suspended in 1000 parts of ice-water. 50 parts of sodium bicarbonate are added and, while cooling with ice, 48.5 parts of copper-phthalocyanine-(3)-tetrasulfochloride are introduced. The mixture is stirred for 2 hours while cooling with ice and then stirred overnight at room temperature. The mixture is then heated for 1 hour at 40–50° C. and for another hour at 60–70° C., 150 parts of potassium chloride are added, the whole is allowed to cool and the condensation product is isolated by suction filtration. After drying the product is esterified as described in Example 4 with 500 parts of concentrated sulfuric acid. The ester dyestuff is obtained in the form of a dark green powder. By the action of alkalies the dyestuff can be fixed on cotton, bluish green dyeings and prints having good properties of fastness being obtained.

The β-hydroxyethyl-[3-nitro-4-(β-aminoethyl-amino)-phenyl]-sulfone of the above formula used for the manufacture of the said dyestuff can be prepared, for example, as follows:

20 parts of copper-II-chloride are introduced into 440 parts of ethylene diamine of 78% strength and 265 parts of β-hydroxyethyl-[(3-nitro-4-chloro)-phenyl]-sulfone are then added slowly, while the temperature is maintained below 70° C. by external cooling. The mixture is stirred for 90 minutes at 80–90° C. and then cooled, poured into 1000 parts of ice-water, stirred for 30 minutes, while cooling, and filtered off with suction. The residue is washed with water and recrystallized from alcohol. 227 parts of β-hydroxyethyl - [3-nitro - 4-(β-amino-ethylamino)-phenyl]-sulfone are obtained in the form of yellow crystals having a melting point of 151–152° C.

A dyestuff of similar properties is obtained when the β-hydroxyethyl-[3-nitro-4-(β-aminoethyl-amino)-phenyl]-sulfone is replaced by 33.7 parts of β-hydroxyethyl-[3-nitro-4-(4'-aminophenyl-amino)-phenyl]-sulfone of the formula

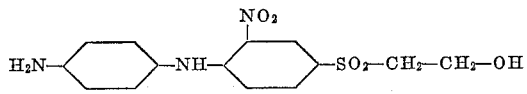

which can be prepared by reacting β-hydroxyethyl-[(3-nitro-4-chloro)-phenyl]-sulfone with 4-amino-acetanilide and subsequently saponifying the product so obtained.

*Example 6*

35 parts of sodium bicarbonate are added to neutralized solution of 43.5 parts of the acid sulfuric acid ester of β-hydroxyethyl-(4-amino)-phenylsulfone in 400 parts of water and 48.5 parts of nickel-phthalocyanine-(3)-tetrasulfochloride are introduced. 5 parts of pyridine are then added and the mixture is stirred for 48 hours at room temperature. The whole is heated for 1 hour at 50° C., the solution obtained is clarified by suction-filtration and the dyestuff is salted out with potassium chloride. After drying, 65 parts of a green blue powder are obtained. The dyestuff is readily soluble in water and can be fixed with alkalies on fibers of native or regenerated cellulose to yield dyeings which are fast to washing and to light.

*Example 7*

80.4 parts of β-hydroxyethyl-(4-amino)-phenylsulfone are converted by heating with 64.8 parts of sulfuric acid of 60% strength into the acid sulfuric acid ester, then stirred with 600 parts of water, mixed at 8–10° C. with 36.7 parts of sodium hydroxide solution of 33° Bé. and rendered neutral to delta-paper by the addition of 12 parts of sodium bicarbonate. 100 parts of copper-phthalocyanine-(3)-tetrasulfochloride of 100% strength are introduced into this solution in the form of a moist paste, and the condensation is carried out at a pH-value of 6–6.5, while stirring at 20–25° C., by adding sodium hydroxide solution and a small amount of pyridine. When the condensation is complete, the solution is mixed with sodium hydroxide solution of 33° Bé. until a pH-value of 12 is attained, the dyestuff is then salted out by the addition of potassium chloride, filtered off with suction and dried. It is a blue powder which dissolves in water to give a blue color solution. From salt-containing dye baths there are obtained with the aid of alkalies on fibers of native and regenerated cellulose clear turquoise blue dyeings which possess good wet fastness properties, a good fastness to rubbing and a good to very good fastness to light.

*Example 8*

50 parts of β-hydroxyethyl-[3-(4′-amino-benzoylamino)-4-hydroxyphenyl]-sulfone of the formula

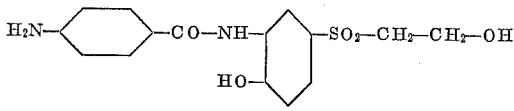

are introduced at a temperature below 40° C. into 200 parts of concentrated sulfuric acid and stirred for 4 hours at 40° C. The solution is then poured on ice, the precipitated sulfuric acid ester is filtered off with suction and washed with a small amount of water. The filter residue is dissolved in water with the addition of sodium bicarbonate, the solution is neutralized and 48.5 parts of copper-phthalocyanine-(3)-tetrasulfochloride are introduced. 5 parts of pyridine are then added to the mixture and the whole is stirred at room temperature, the neutral reaction being maintained by adding dropwise 2 N sodium hydroxide solution. When sodium hydroxide solution is no longer consumed, the product is isolated in the usual manner. A turquoise blue dyestuff is obtained which yields on cotton by the action of agents having alkaline reaction, dyeings which are fast to washing and to light.

The β-hydroxyethyl-[3-(4′-amino-benzoylamino)-4-hydroxyphenyl]-sulfone of the above formula, which is used for the manufacture of the said dyestuff, can be prepared by reacting β-hydroxyethyl-(3-amino-4-hydroxy)-phenyl-sulfone with 4-nitrobenzoyl chloride and subsequently reducing the product so obtained.

We claim:

1. A water-soluble phthalocyanine dyestuff of the formula

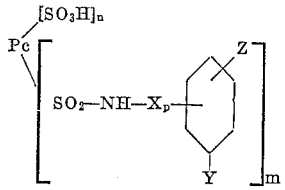

wherein Pc is metal phthalocyanine, X represents a member selected from the group consisting of

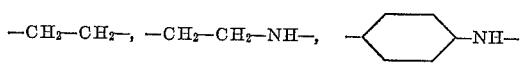

and

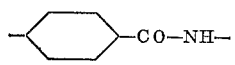

p means an integer of 0 and 1, Y represents a member selected from the group consisting of

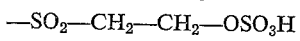

and —SO$_2$—CH=CH$_2$, X standing in one of the positions meta and para to Y, Z represents a member selected from the group consisting of hydrogen, bromine, methyl, methoxy, nitro, hydroxl, carboxy and sulfo, n represents a whole number of 1 to 3 and m likewise a whole number of 1 to 3, the sum of n and m being at most 4.

2. A water-soluble phthalocyanine-dyestuff of the formula

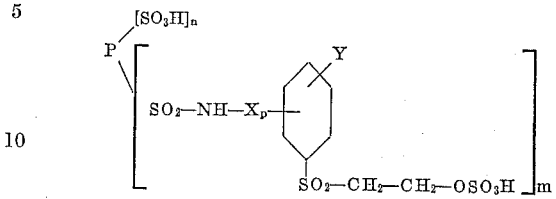

wherein Pc stands for nickel phthalocyanine or copper phthalocyanine, X represents a member selected from the group consisting of —CH$_2$—CH$_2$—,

—CH$_2$—CH$_2$—NH—

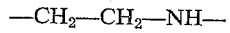

p means an integer of 0 and 1, X standing in one of the positions meta and para to the group

—SO$_2$—CH$_2$—CH$_2$—OSO$_3$H

Z represents a member selected from the group consisting of hydrogen, bromine, methyl, methoxy, nitro, hydroxyl, carboxy and sulfo, n represents a whole number of 1 to 3 and m likewise a whole number of 1 to 3, the sum of n and m being at most 4.

3. The water-soluble phthalocyanine-dyestuff of the formula

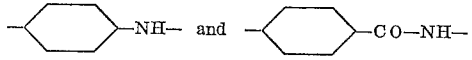

wherein Pc is copper phthalocyanine, n represents a whole number of 1 and 2, and m likewise a whole number of 1 and 2, the sum of n and m being 3.

4. The water-soluble phthalocyanine-dyestuff of the formula

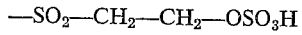

wherein Pc is copper phthalocyanine, n represents a whole number of 1 to 3 and m likewise a whole number of 1 to 3, the sum of n and m being 4.

5. The water-soluble phthalocyanine-dyestuff of the formula

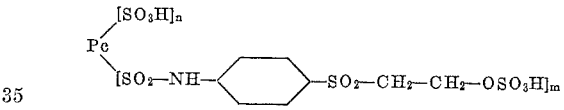

wherein Pc is copper phthalocyanine, n represents a whole number of 1 to 3 and m likewise a whole number of 1 to 3, the sum of n and m being 4.

6. The water-soluble phthalocyanine-dyestuff of the formula

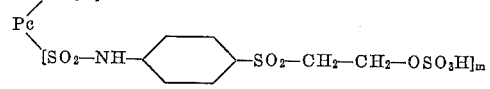

wherein Pc is copper phthalocyanine, n represents a whole number of 1 to 3 and m likewise a whole number of 1 to 3, the sum of n and m being 4.

7. The water-soluble phthalocyanine-dyestuff of the formula

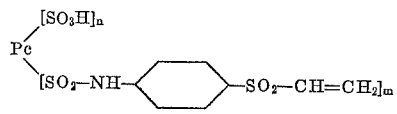

wherein Pc is copper phthalocyanine, $n$ represents a whole number of 1 to 3 and $m$ likewise a whole number of 1 to 3, the sum of $n$ and $m$ being 4.

8. The water-soluble phthalocyanine-dyestuff of the formula

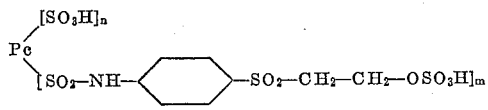

wherein Pc is nickel phthalocyanine, $n$ represents a whole number of 1 and 2 and $m$ likewise a whole number of 1 and 2, the sum of $n$ and $m$ being 3.

References Cited by the Examiner

UNITED STATES PATENTS

| 2,657,205 | 10/1953 | Heyna et al. | 260—314.5 |
| 2,670,265 | 2/1954 | Heyna et al. | 260—314.5 |
| 2,935,506 | 5/1960 | Heslop et al. | 260—314.5 |
| 3,046,075 | 7/1962 | Kantner et al. | 260—314.5 |
| 3,062,830 | 11/1962 | Buc et al. | 260—314.5 |

OTHER REFERENCES

Wegmann, Textil-Praxis (Oct. 1958), pages 1056–1061.

WALTER A. MODANCE, *Primary Examiner.*

IRVING MARCUS, JOHN D. RANDOLPH, *Examiners.*

J. A. PATTEN, *Assistant Examiner.*